Feb. 8, 1966 C. E. THOMAS 3,233,588
EXCREMENT DISPOSAL DEVICE FOR INDOOR USE
Filed June 9, 1964
2 Sheets-Sheet 1

Charles E. Thomas
INVENTOR.

Feb. 8, 1966 C. E. THOMAS 3,233,588
EXCREMENT DISPOSAL DEVICE FOR INDOOR USE
Filed June 9, 1964 2 Sheets-Sheet 2

Charles E. Thomas
INVENTOR.

United States Patent Office 3,233,588
Patented Feb. 8, 1966

3,233,588
EXCREMENT DISPOSAL DEVICE
FOR INDOOR USE
Charles E. Thomas, Oklahoma City, Okla.
(Box 93, Montrose, Colo.)
Filed June 9, 1964, Ser. No. 373,811
4 Claims. (Cl. 119—1)

The present invention relates to a portable manually usable device which is functionally designed and structurally adapted for effectually collecting and thereafter handling and conveniently disposing of animal excrement and has to do with a device which is such in construction and use that it well serves the purposes for which it is intended.

More specifically the invention pertains to a sanitary-type household sand box characterized by a novel construction and arrangement of simple coacting pans and a readily insertable and removable sieve-like sand sifting pan dividing screen.

Indoor-type sand boxes for pets, cats, for exmple, are old and well known. As a matter of fact, special type sand boxes have been devised wherein the coacting component parts are such in construction that means is provided to cope with the perplexing problem of handling and acceptably disposing of foul-smelling excrement and the attending stench unless it has been efficaciously taken care of. A typical example of a generally analogous prior art adaptation is Patent 2,971,493 of Feb. 14, 1961, granted to Robb and pertaining to a sanitary sand box for cats. Reference to the stated patent will enable the reader to quickly ascertain the background and state of the art and will serve to make it apparent that it is an objective in the instant presentation to structurally, functionally and in other ways improve upon the Robb patent and any other similarly constructed and performing pet commodes and, in so doing, to provide an innovation which achieves the improved result desired.

Briefly, the invention herein disclosed comprises three simple units; namely, two telescopically and separably connectible rectangular pans preferably constructed of lightweight galvanized sheet metal, and a readily insertable and removable divider or partitioning unit which constitutes an innovation in that it provides not only a sieve-like sand sifting and transferring screen but a collector for trapping and handling the disposable excrement.

To the ends desired the two pans are similarly constructed, there being a first pan which serves initially and normally as a temporary container for the sand desired. A second pan is complemental to and provides a companion cover for the receptacle portion of the first panel. The latter pan has an upstanding rim provided with a turned in horizontal flange which constitutes a ledge. When the pan dividing and separator screen is brought into use the marginal frame is supported by the flange whereby the latter constitutes a ledge therefor.

Particular novelty is predicated on providing the frame of the screen or separator with adapter means. This means preferably comprises a pair of simple elongated brackets, each bracket having a channel-shaped portion which functions as a hook. The two hooks are disposed exteriorly of the rim of the first pan and serve to seat and support the walls of the rim of the second or cover pan.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
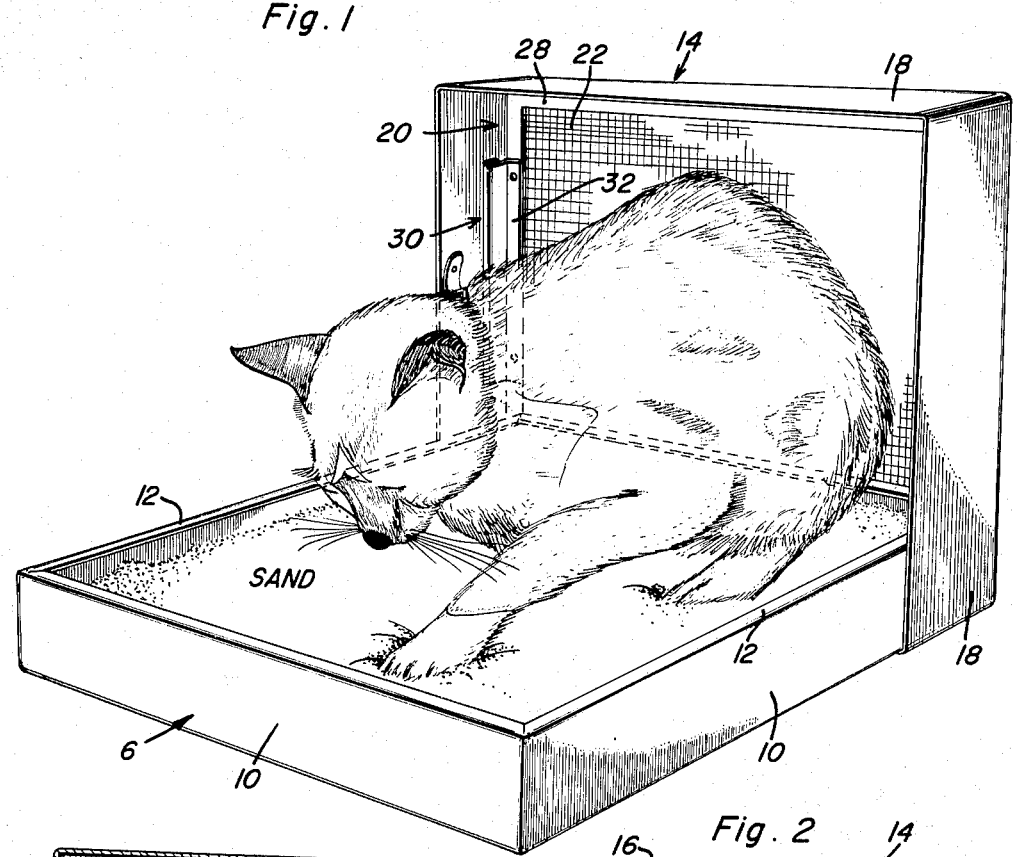
FIGURE 1 is a view in perspective of an excrement handling and disposal device for indoor use constructed in accordance with the present invention and showing the two pans in their ready-to-use position and, in addition, showing the animal using the sand in the then existing "bottom" pan, the divider having been temporarily stored for readiness of use.
Figure 2:
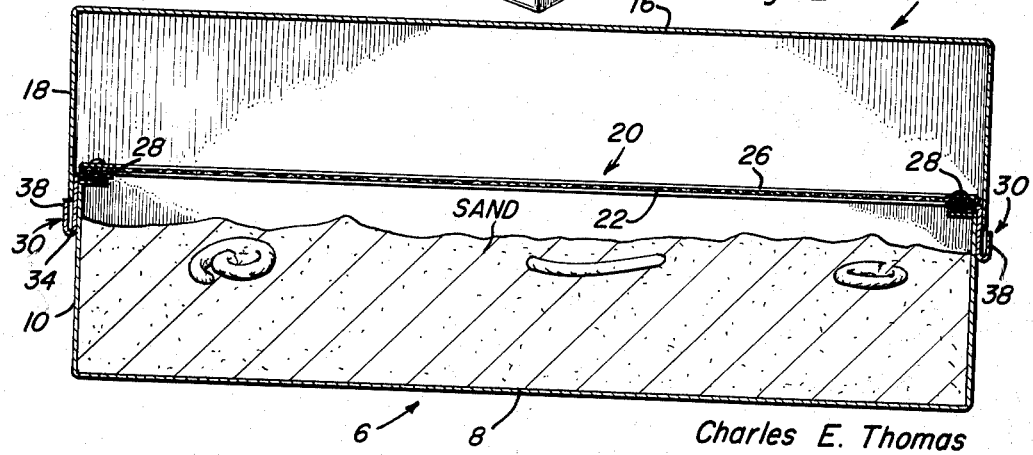
FIGURE 2 is a view which ties in with FIGURE 1 but is on a larger scale and appears in section and serves to show the excrement embedded in the sand, with the two pans in coacting relationship and the divider spanning the alinged receptacle portions thereof.
Figure 3:
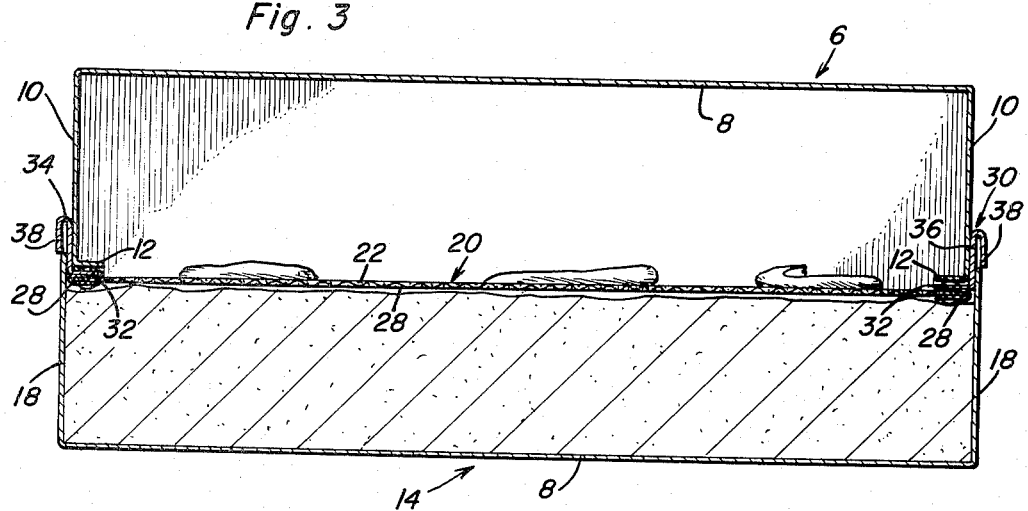
Figure 4:
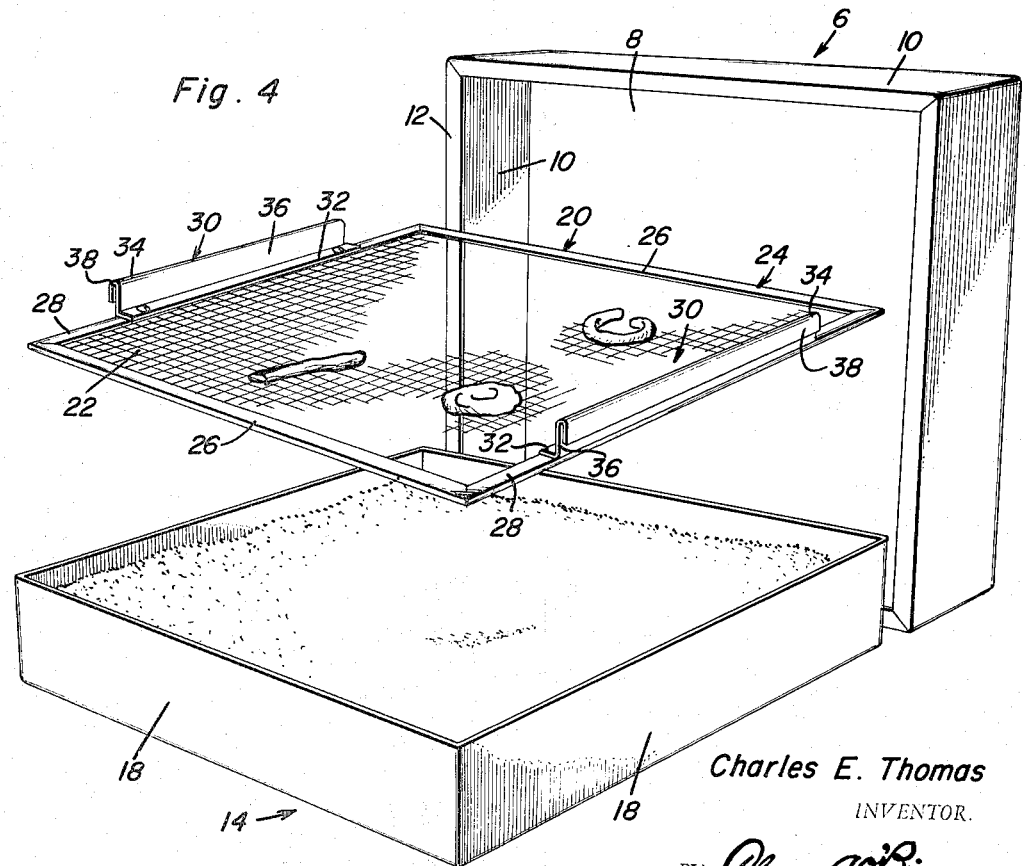

FIGURE 3 is a view based on FIGURE 2 and wherein the tow interconnected or telescoping pans have been temporarily bracketed together and inverted or turned upside down in order to effect not only the transfer of sand by sifting from one pan to the other but the collection of the ready-to-dispose of excrement; and FIGURE 4 is a view in perspective similar, in a manner of speaking, to FIGURE 1 but showing the pans in reverse order and showing, what is more important, the removal of the separator or screen from the second pan and readied to be disposed of.

Reference will be made first to FIGS. 1 and 2 wherein the numeral 6 designates a first closed-bottom open top rectangular galvanized sheet-metal or an equivalent metal pan which is approximately 14 inches by 14 inches and approximately 3 inches in depth. This pan has a flat bottom wall as shown at 8 in FIG. 2 and upstanding encompassing vertical walls 10 which conjointly provide the aforementioned rim. The upper edges of the walls 10 are provided with turned-in flanges which constitute lips 12 and these flanges conjointly provide not only a reinforcing member but an appropriate ledge which serves the purpose shown in FIG. 2. The companion or complemental second open-bottom, closed top pan is denoted by the numeral 14 and comprises a flat main wall 16 with lateral cooperating walls 18 which conjointly define a marginal rim and a receptacle portion.

The receptacle portion is slightly deeper than the receptacle portion of the first pan 6. The size of the pan 14 is slightly larger than the first pan to allow one to nest inside the other one and to permit the second pan to serve as a lid-like cover for the first pan (FIG. 2).

Taking up now the third component or unit, this is a structurally distinct part and as a matter of fact is thought to be an innovation in this field of endeavor. It is identifiable either as a divider or separator and is denoted, as an entity, by the numeral 20. It comprises a substantially rigid rectangular sand shifting excrement supporting screen 22 of suitable material and mesh. The marginal edges are firmly bound in a suitable binder or frame 24 embodying diametrically opposite component portions 28, these portions 26 and 28 being separately designated for the reason that the diametrically opposite pair of adapters 30 are mounted on the frame portions 28 as distinguished from the portions or members 26. The adapters are elongated and are made from non-corrodible sheet material and each adapter has an elongated flange 32 which is superimposed upon the cooperating frame member 28 and fixedly joined thereto in any practical manner. The main sheet portion is bent upon itself as shown at 34 to define an elongated open-ended readily applicable and adaptable channel having an inward wall 36 and an outward wall 38 which is narrower than the wall 36. These two walls cooperate in defining a hook-like pan assembling and retaining hook.

Because of the fact that the first and second pans 6 and 14 are similar in construction and have to be inverted or turned upside down in order to attain the end result desired they have been differentiated as a first pan 6 and a second pan 14. On the other hand and despite the fact that the terms are used advisedly one may refer to the pan 6 in FIGS. 1 and 2 as the bottom pan and the pan 14 as the top or cover pan. In any event, and in the manner of use shown in FIGS. 1 and 2, the separator or divider 20 has been positioned so that the frame rests on the ledge 12 prior to joining the top or cover pan 14 with the underlying bottom pan 6. Of course, in the first step illustrated in FIG. 1 the separator 20 can be stored temporarily in the lid or cover and when the result desired is initiated the components are assembled as illustrated in FIG. 2. Here the screen separates the receptacle portions of the two pans. Also, the adapter brackets or adapters 30 are such that the channel members are disposed outwardly of the walls of the rim of the pan 6 whereby the channels constitute keepers and seat the lower edge portions of the rim walls 18 of the cover pan 14. Now the device can be turned upside down or inverted as illustrated in FIG. 3 in order that the sand can be sifted from one receptacle portion into the other and whereby to thus transfer or trap the excrement or components thereof on the screen in the manner shown in FIG. 4. Consequently by removing the pan 6 which has temporarily become the cover the screen is uncovered and can be lifted off and the media thereon can be readily disposed of in the manner desired. The separator or divider is usually made of one-quarter inch hardware cloth mounted on all four edges with three-quarter inch galvanized metal folded and edged.

This invention obviates the necessity of resorting to the customary old fashioned procedure or practice of sorting out and scooping up refuse from litter material in the care and tending of pets, for example, cats. The invention is completely portable and the component parts are properly proportioned and cooperate to achieve the improved results desired.

In practice the galvanized metal pan (the "lower" pan for example) can and often will be made of a suitable plastic material. Alternatively, the interior of the pan, if made of galvanized metal, may be plastic-coated to resist the damaging affects of acid. Then, too, the entire structure can be made of colorful commercial plastics. Further, the flange 12 can be acceptably omitted when marketing a small-sized adaptation.

It is believed that a careful consideration of the specification in conjunction with the invention as claimed will enable the reader to obtain a clear and comprehensive understanding of the subject matter of the invention, the features and advantages and the manner of adopting and using the same for satisfactory results. Accordingly, a more extended description is regarded as unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A portable excrement collecting sand box for pets, cats for example, comprising: a first closed-bottom open-top sand containing and confining pan, a second open-bottom closed-top pan complemental to said first pan, both pans having coordinating marginal rims, the rim of the first pan fitting telescopingly within the confines of the rim of the second pan, and a bodily applicable and removable divider embodying a sieve-like sand sifting screen spanning the open top of said first pan and embodying a marginal frame provided with adapters, said adapters functioning to orient the rims of both pans and also serving to position and retain the pans and screen in assembled relationship and to facilitate the necessary step of reversing and turning the pans upside down so that the sand can then be transferred by gravity from the receptacle portion of the first pan to the receptacle portion of the second pan whereby the feces is trapped and retained on said screen for convenient disposition.

2. The invention according to claim 1, and wherein said adapters comprise a pair of diametrically opposite brackets, each bracket embodying a channel-shaped member constituting and providing a hook which is releasably hooked over the edge of a rim portion of said first pan.

3. The invention according to claim 1 and wherein each adapter comprises an elongated bracket being fixedly mounted on said frame and having an elongated channel-shaped member constituting a hook-like keeper and being releasably hooked over the edge of a rim portion of said first pan.

4. For use by a pet, a cat for example, a portable indoors sand box for collecting, handling and disposing of animal excrement with requisite nicety comprising: a first open top pan having a bottom and an encompassing upstanding rim, said rim embodying coacting walls, the upper edges thereof being turned horizontally and inwardly toward each other and providing a supporting ledge, a manually applicable sand sifting and excrement separating screen spanning said open top and provided with a marginal frame removably seated atop said ledge, said frame being provided at diametrically oppositely disposed points with a pair of adapter brackets, said brackets being in turn provided with exteriorly disposed open-ended channel-shaped members constituting screen orienting, retaining, and pan assembling keepers, and a second pan having a closed top and open bottom and a depending rim fitting telescopically over the upper marginal portion of the rim of said first pan and having lower edge portions removably seated and temporarily retained in their respectively cooperable keepers.

References Cited by the Examiner
UNITED STATES PATENTS

| | | | |
|---|---|---|---|
| 789,517 | 5/1905 | Williamson | 209—251 |
| 2,713,321 | 7/1955 | Keen | 119—1 |
| 2,963,003 | 12/1960 | Oberg et al. | 119—1 |
| 3,039,601 | 6/1962 | Martin | 220—47 |

SAMUEL KOREN, *Primary Examiner.*

HUGH R. CHAMBLEE, *Examiner.*